(No Model.)
O. KNUTSON.
HARVESTER REEL.
No. 473,072. Patented Apr. 19, 1892.
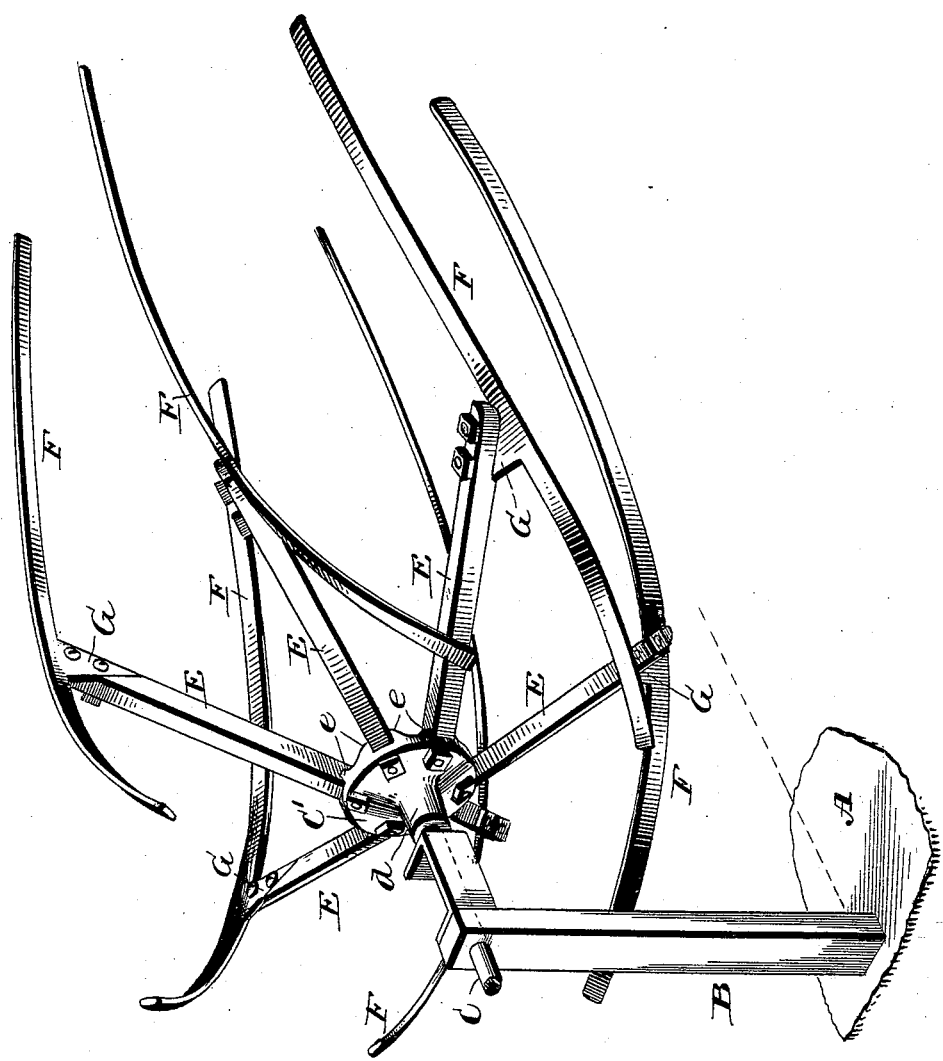
Witnesses
C. J. Williamson
A. L. Hough
Inventor
Ole Knutson,
by Franklin H. Hough
his Attorney

UNITED STATES PATENT OFFICE.

OLE KNUTSON, OF HERMAN, MINNESOTA.

HARVESTER-REEL.

SPECIFICATION forming part of Letters Patent No. 473,072, dated April 19, 1892.

Application filed October 13, 1891. Serial No. 408,594. (No model.)

*To all whom it may concern:*

Be it known that I, OLE KNUTSON, a citizen of the United States, residing at Herman, in the county of Grant and State of Minnesota, have invented certain new and useful Improvements in Harvester-Reels; and I do declare the following to be a full, clear, and exact description of the invention, such as will enable others skilled in the art to which it appertains to make and use the same, reference being had to the accompanying drawing, and to the letters of reference marked thereon, which forms a part of this specification.

This invention relates to certain new and useful improvements in reels for harvesting-machines; and it has for its objects, among others, to provide an improved reel which shall be simple, strong, and durable and which will accomplish more work with more satisfactory results and with less labor, time, and waste of material than prior constructions.

The objects and advantages of the invention will hereinafter appear, and the novel features thereof will be specifically defined by the appended claim.

The invention is clearly illustrated in the accompanying drawing, which, with the letters of reference marked thereon, forms a part of this specification, and in which I have shown a perspective view showing my improved reel.

Like letters of reference indicate like parts in the drawing.

Referring now to the details of the drawing by letter, A designates a portion of a harvester-platform, and B a suitable standard or upright rising therefrom, and at the upper end of which is suitable provision for the journaling of the reel-shaft C. This shaft is but a short stub-shaft, leaving the center of the reel entirely unobstructed, yet sufficiently strong to support the reel and prevent it from bending or injury during its operation.

The reel consists of a disk C', with a boss $d$ for the reception of the reel-shaft and with sockets or ribs $e$ for the reception of the arms E, which are fitted therein to stand at an angle of about forty-five degrees from the plane of the disk, being held in the sockets or ribs in any suitable manner, as by bolts and nuts, as shown.

On the outer ends of the arms E are the slats or bars F, which are secured thereto in any suitable manner—as, for instance, by triangular plates G, either integral with or rigidly secured to the slats and held to the arms by bolts and nuts or any other preferred means. These slats or bars extend substantially parallel with the reel-shaft, but are curved, with their inner ends slightly bent inward, as seen in the figure. The slats are so placed in position that the ends of the same cross over the cutter-bar near the elevator (not shown) in advance or ahead of the other end, being curved gradually, so as to counterbalance the force of the straw that is carried over the platform and so that it will pass over the cutter-bar or a certain line at a uniform height.

The reel may be constructed of any desired material and of course may be varied in size, according to the wishes of the maker or user.

What I claim as new is—

The reel described, consisting of a disk with sockets, arms fitted in the sockets and extending in an inclined direction from the disk and having beveled outer ends, and slats carried by the outer ends of the arms and having tapered portions secured to the beveled ends of the arms and curved, substantially as and for the purpose specified.

In testimony whereof I affix my signature in presence of two witnesses.

OLE KNUTSON.

Witnesses:
T. O. UDBYE,
CHARLES O. WINGER.